United States Patent Office 3,371,212
Patented Feb. 27, 1968

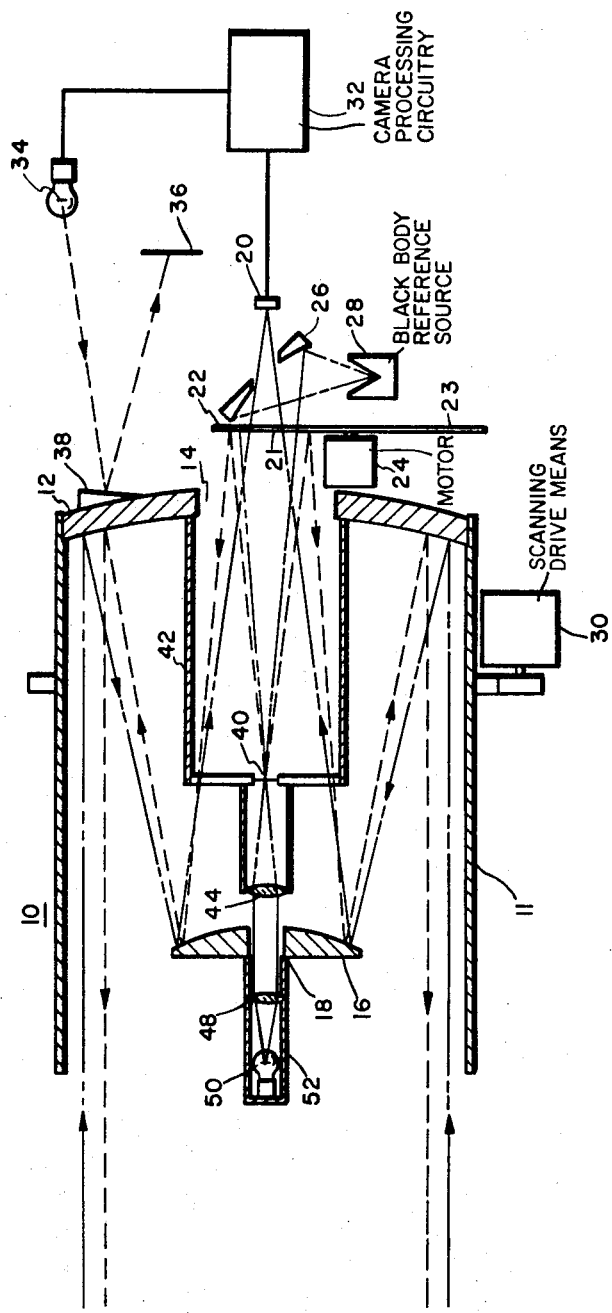

3,371,212
LIGHT SPOT PROJECTION SYSTEM FOR INFRARED CAMERA
Morris Weiss, Stamford, Conn., assignor to Barnes Engineering Company, Stamford, Conn., a corporation of Delaware
Filed Nov. 13, 1963, Ser. No. 323,426
4 Claims. (Cl. 250—83.3)

ABSTRACT OF THE DISCLOSURE

A light source and a collimating lens are mounted on and movable with a secondary mirror of an optical telescope of a radiometer. The primary mirror of the telescope has a reimaging lens and reticle mounted thereon in optical alignment with the light source and collimating lens. The arrangement provides automatically focusing a light spot projected from the radiometer as well as ready access to the light source.

---

This invention relates to a light spot projection system for radiometers, thermographs, and similar devices, which provides a means for aiming and focusing such instruments.

In Patent No. 2,895,049 to Astheimer et al., entitled "Image Transducer," an infrared camera, which is now called a thermograph, is described which produces heat pictures, or thermograms, of a field of view of the camera by the self-radiation emitted by the objects in the field of view. The camera includes an infrared detector which is optically scanned across the field of view by an optical system which oscillates horizontally, and changes its vertical position at the end of each horizontal scan to form a raster of the field of view of the instrument. The radiation applied from the optical means to the detector is modulated by a chopper which alternately interrupts and passes the radiation from the field of view to the detector. A black body reference source is imaged on the detector when the field of view is blocked by the chopper. The output so obtained from the detector is amplified and synchronously demodulated in the electronic camera processing circuitry and applied to modulate a light source, such as a glow tube, which is capable of responding to the data frequency. The glow tube is scanned across a suitable recording surface, such as photographic film, in synchronism with the scanning optics of the detector, for example, by mounting a mirror on the scanning optics. A thermogram is thus produced on the photographic surface, which is a reproduction of the infrared output of the detector in various shades of gray between black and white in accordance with the infrared radiation from the field of view.

The infrared camera so described is a form of scanning radiometer. In this and other types of radiometers, it is desirable to have some indication of what point in the field of view is being seen or scanned. One way of providing this indication was by the use of a lamp filament which was positioned in a conjugate focal position and projected out of the system as a light spot which provided a flying spot by means of the scanning mirror, allowing visible observation of the moving spot in the field of view of the instrument. The difficulty encountered with this arrangement was its positioning within the instrument. If the lamp burned out while in use, it was very inconvenient and awkward for the user to properly replace and accurately align the lamp. These operations required the dismantling of the instrument and extensive alignment procedures.

Accordingly, it is an object of this invention to provide an improved light spot projection system for thermographs, radiometers, and the like, with an easily accessible light source which may be replaced easily and without requiring extensive alignment procedures once it is removed and replaced.

It is a further object of this invention to provide an improved light spot projection system for radiometric instruments in which the light spot is automatically focused when the optical system of the instrument is focused.

In carrying out this invention in one illustrative embodiment thereof, a light source and a collimating lens are mounted on and movable with a secondary mirror which forms a part of an optical telescope for the radiometric instrument. A primary mirror which forms the other portion of the optical telescope for the instrument has a reimaging lens and a reticle mounted thereon in optical alignment with the light source and collimating lens. By mounting the light source directly on the secondary, or focusing mirror of the optical telescope, the light source is in a readily accessible position in the instrument so that it may be changed easily. Since the light from the light source is collimated, its movement with the secondary mirror does not change the illumination falling on the reticle. The line of sight in space is fixed by the location of the reticle and therefore is independent of the light source.

The invention, both as to its organization and method of operation, together with further objects and advantages thereof, may best be understood from the following description taken in connection with the accompanying drawing.

The drawing is a schematic diagram of an infrared camera including the improved visible light spot projection system embodied in this invention.

Referring now to the drawing, incoming radiation from a field of view of the instrument is applied via an optical telescope 10 which includes a primary mirror 12 having a central opening 14 therein, and a secondary mirror 16 having a central opening 18 therein, to a radiation detector 20. The radiation collecting optics 10 may comprise a Cassegrain system or any other two-part optical telescope arrangement which performs the function of imaging radiation from a field of view onto the detector 20. The particular type of two-part optical system may depend somewhat on the particular application to which the instrument is subjected. A scanning drive means 30 is mechanically coupled to a mounting base 11 which carries the optical telescope 10, for suitably scanning the detector over the field of view to form a raster of the field of view. This scanning drive means may be of the type shown in the aforesaid Astheimer et al. patent. A chopper wheel 22 driven by a chopper motor 24 is interposed between the primary mirror 12 and the radiation detector 20. The chopper wheel 22 is made up of blades having double-mirrored surfaces 21 and 23, which alternately pass and block radiation from the field of view to the detector 20. A toroidal mirror 26 and a black body reference source 28 are provided in optical alignment with one of the mirrored surfaces 23 of the chopper blade 22, so that when radiation from the field of view is blocked from the detector, the detector sees the black body reference source 28. The differential output from the detector 20 as supplied by the difference between the radiation from the black body reference 28 and the field of view is applied to camera processing circuitry 32, the output of which is used to modulate a glow tube 34. The modulated output of the glow tube 34 is applied via a scanning mirror 38, which is mounted directly on the primary mirror 12 and accordingly moves in synchronism therewith, to a photographic film 36. The modulated output from the glow tube 34 is reflected from the scanning mirror 38 onto the photographic film 36 to provide a recorded heat picture, or thermogram, of the field of view of the infrared camera or thermograph.

The light spot projecting system includes a light source 50 and a collimating lens 48 fixedly mounted on a support 52 to the secondary mirror 16. The light source passing through the collimating lens 48 provides a collimated light source which passes through the central opening 18 in the secondary mirror 16. A reimaging lens 44 and a reticle 40 are mounted by a support 42 directly on the primary mirror 12. The reticle 40 is positioned at the conjugate focal point of the optical telescope 10. Accordingly, the reticle 40 is at the same optical distance from the primary mirror 12 as the detector 20. The collimated light coming through the central opening 18 of the secondary mirror 16 is imaged on the reticle 40 by the reimaging lens 44. Since the reticle 40 is in a fixed position with respect to the primary mirror 12 and the detector 20, and since the light source is collimated, movement of the light source 50 with respect to the secondary mirror 18 does not change the illumination spot.

The light spot projection system provides a spot of light in the field of view in the following manner: The light emitted from the light source 50 is collimated by the collimating lens 48 and reimaged by the reimaging lens 44 on the reticle 40. When the chopper blade is closed, the mirrored surface 21 of the chopper blade reflects the illuminated reticle 40 onto the secondary mirror 16 which reflects off the primary mirror 12 and out into the field of view as is shown by the dotted lines in the drawing. It is readily apparent that the light spot does not lose its focus when it moves, because the reticle remains in a fixed position. It is also apparent that the light source is readily accessible from the outside of the instrument, so that a complete dismantling of the instrument is unnecessary when the light 50 needs to be replaced. The combination of the collimating lens and the reimaging lens and reticle 40 eliminate the need for alignment procedures when the lamp 50 is replaced.

Although the invention has been described in connection with an infrared camera, it will be obvious that it is not restricted thereto, and may be used in any radiometric instrument where it is necessary to provide some indication of the point in the field of view which is being examined by the instrument. It will further be apparent that the use of the invention is not restricted to infrared, but may also be used with visible, ultraviolet, and other types of radiation measuring instruments.

Since other modifications, varied to fit particular operating requirements and environments, will be apparent to those skilled in the art, the invention is not considered limited to the examples chosen for purposes of disclosure, and covers all changes and modifications which do not constitute departures from the true spirit and scope of this invention.

What I claim as new and desire to secure by Letters Patent is:

1. In an infrared thermograph which includes an infrared detector, means for scanning the detector across a field of view, and means for making a thermogram of the detector output, the improvement being a visible light spot system for indicating the point in the field of view seen by the detector, comprising, in combination, (a) a primary mirror having a central opening therein for scanning the field of view of the infrared detector,
(b) a secondary mirror having a central opening therein for focusing radiation received from the field of view from said primary mirror onto said detector,
(c) a mirrored interrupting means positioned between said primary mirror and said detector for periodically interrupting the radiation applied from said secondary mirror to said detector,
(d) a light source and a collimating lens mounted on said secondary mirror for movement therewith for providing a source of collimated light which is passed through the opening therein,
(e) a reimaging lens and a reticle mounted on said primary mirror in optical alignment with said light source and said collimating lens whereby light from said source is reflected from said mirror interrupting means when said means interrupts radiation applied from said secondary mirror to said detector and is also reflected by said secondary and primary mirrors to the point in the field of view seen by said detector.

2. The structure set forth in claim 1 wherein said mirrored interrupting means has a mirrored surface on both sides thereof, a toroidal mirror positioned between said double mirrored surface and said detector, and a black body reference source positioned to be imaged by said toroidal mirror on said detector when said mirrored interrupting means blocks radiation from said field of view.

3. The structure set forth in claim 1 wherein said primary and secondary mirrors are a Cassegrain optical telescope.

4. In a radiometer, a visible light spot projection system for visually indicating the line of sight and focus of the radiometer, comprising, in combination, (a) a radiation detector,
(b) optical means comprising a primary mirror and a secondary mirror for focusing radiation from a field of view onto said detector, each said mirror having a central opening therethrough,
(c) a light source and a collimating lens mounted on said secondary mirror for movement therewith for providing a source of collimated light which is passed through the opening therein,
(d) a reimaging lens and a reticle mounted on said primary mirror in optical alignment with said light source and said collimating lens, and
(e) a mirrored means for periodically interrupting the radiation applied from said optical means on said detector and applying it to said reticle whereby light from said source is reflected from said mirrored means and said optical means to the point in the field of view on which the detector is focused.

References Cited

UNITED STATES PATENTS 3,130,308  4/1964  Astheimer _____ 250—83.3
3,169,189  2/1965  Barnes et al. _____ 250—83.3

ARCHIE R. BORCHELT, *Primary Examiner.*